(12) United States Patent
Kaijima

(10) Patent No.: US 10,124,549 B2
(45) Date of Patent: Nov. 13, 2018

(54) METHODS FOR MANUFACTURING A LENS, LENS MANUFACTURING SYSTEMS, AND LENSES

(71) Applicant: Singapore University of Technology and Design, Singapore (SG)

(72) Inventor: Sawako Kaijima, Singapore (SG)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 311 days.

(21) Appl. No.: 14/889,883

(22) PCT Filed: May 9, 2013

(86) PCT No.: PCT/SG2013/000184
§ 371 (c)(1),
(2) Date: Nov. 9, 2015

(87) PCT Pub. No.: WO2014/182240
PCT Pub. Date: Nov. 13, 2014

(65) Prior Publication Data
US 2016/0114543 A1    Apr. 28, 2016

(51) Int. Cl.
*F21V 1/00* (2006.01)
*B29D 11/00* (2006.01)
(Continued)

(52) U.S. Cl.
CPC .. *B29D 11/00961* (2013.01); *B29D 11/00951* (2013.01); *G02B 27/0012* (2013.01);
(Continued)

(58) Field of Classification Search
CPC ................ F21S 8/06; F21S 8/065; F21S 8/04
(Continued)

(56) References Cited

U.S. PATENT DOCUMENTS 5,653,530 A * 8/1997 Pittman ................ A47G 33/08
362/104
6,241,355 B1   6/2001 Barsky
(Continued)

FOREIGN PATENT DOCUMENTS

CN     201425176 Y     3/2010
CN     201652083 U     11/2010
(Continued)

OTHER PUBLICATIONS

Houzz Inc., Double Cylinder Glass Pendant, http://www.houzz.com/photos/2239164/Double-Cylinder-Glass-Pendant-lamp-shades-, retrieved Apr. 19, 2013.
(Continued)

*Primary Examiner* — Son Mai
(74) *Attorney, Agent, or Firm* — Viering, Jentschura & Partner mbb

(57) ABSTRACT

According to various embodiments, a method for manufacturing a lens may be provided. The method may include: determining a NURBS (non-uniform rational basis spline) representation of a provisional lens geometry; simulating ray trajectories in a lens with the provisional lens geometry based on the NURBS representation; determining a final lens geometry based on the simulated ray trajectories; and producing a lens with the final lens geometry.

16 Claims, 16 Drawing Sheets

(51) Int. Cl.
  *G02B 27/00* (2006.01)
  *G05B 19/4099* (2006.01)
  *F21S 8/06* (2006.01)
  *F21S 8/04* (2006.01)
  *B29K 69/00* (2006.01)

(52) U.S. Cl.
  CPC ...... *G05B 19/4099* (2013.01); *B29K 2069/00* (2013.01); *F21S 8/04* (2013.01); *F21S 8/06* (2013.01); *G05B 2219/35134* (2013.01); *G05B 2219/49007* (2013.01)

(58) Field of Classification Search
  USPC ..................................................... 362/217.02
  See application file for complete search history.

(56) References Cited

U.S. PATENT DOCUMENTS

| | | | |
|---|---|---|---|
| 6,533,446 B2* | 3/2003 | Chen | F21S 8/00 362/145 |
| 6,685,335 B1* | 2/2004 | Yeh | F21L 4/00 362/184 |
| 7,083,315 B2* | 8/2006 | Hansler | B64F 1/20 362/559 |
| 7,699,490 B2* | 4/2010 | Tsai | F21S 6/004 362/101 |
| D643,150 S | 8/2011 | Chen et al. | |
| 8,439,512 B2* | 5/2013 | Isogai | F21K 9/232 313/498 |
| 2004/0075809 A1 | 4/2004 | Wildsmith et al. | |
| 2004/0207807 A1 | 10/2004 | Lindacher | |
| 2006/0055876 A1 | 3/2006 | Hall et al. | |
| 2007/0225950 A1 | 9/2007 | Dursteler Lopez et al. | |
| 2007/0241653 A1 | 10/2007 | Chou | |
| 2009/0237399 A1 | 9/2009 | Bailey | |
| 2011/0090701 A1 | 4/2011 | Zhang et al. | |
| 2011/0103070 A1 | 5/2011 | Zhang et al. | |
| 2012/0307503 A1 | 12/2012 | Wilcox et al. | |
| 2015/0377461 A1* | 12/2015 | Hutchins | F21S 8/065 362/237 |

FOREIGN PATENT DOCUMENTS

| | | |
|---|---|---|
| CN | 202484868 U | 10/2012 |
| CN | 202553397 U | 11/2012 |
| DE | 20018053 U1 | 2/2001 |
| EP | 1176435 A1 | 1/2002 |
| EP | 1566666 A1 | 8/2005 |
| EP | 1744203 A1 | 1/2007 |
| EP | 2278388 A1 | 1/2011 |
| GB | 881140 A | 11/1961 |
| TW | M302121 U | 12/2006 |

OTHER PUBLICATIONS

H. Park, A solution for NURBS modelling in aspheric lens manufacture, The International Journal of Advanced Manufacturing Technology, Jan. 1, 2004, vol. 23, iss. 1-2, pp. 1-10.
Wikipedia, Polycarbonate, https://en.wikipedia.org/wiki/Polycarbonate, retrieved Apr. 22, 2013.
Bjorn Gustavsson, Optical bench, http://www.mathworks.com/matlabcentral/fileexchange/27412-optical-bench, Apr. 29, 2010.
Avago Technologies, HSMQ-C1xx and HSMR-C1xx, Apr. 9, 2010.
Chinese Office Action based on Application No. 201380077717.X(7 pages) dated Nov. 28, 2016 and its English Translation (3pages) (for reference purpose only).
International Search Report based on Application No. PCT/SG2013/000184 (4 pages) dated Mar. 14, 2014 (for reference purpose only).
Chinese Search Report based on application No. 201380077717.X (1 page) dated Nov. 10, 2016 (Reference Purpose Only).
Chinese Office Action based on application No. 201380077717.X (8 pages and 5 pages of English translation) dated Oct. 10, 2017 (Reference Purpose Only).

* cited by examiner

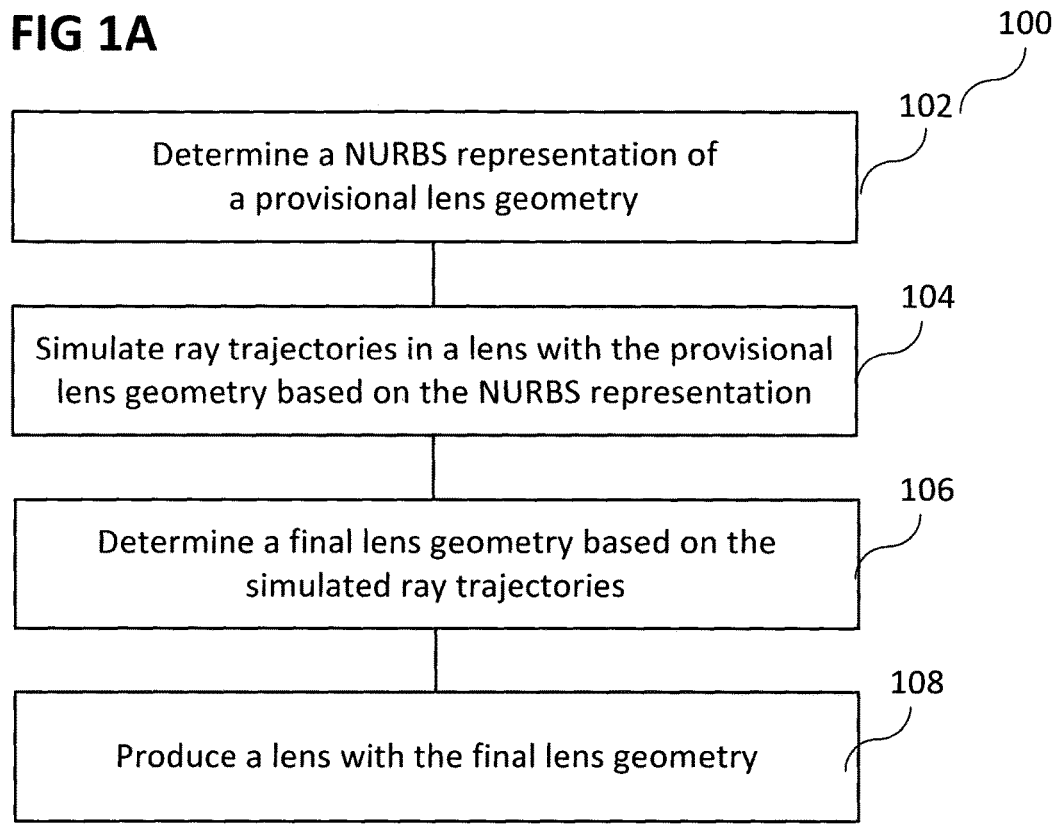
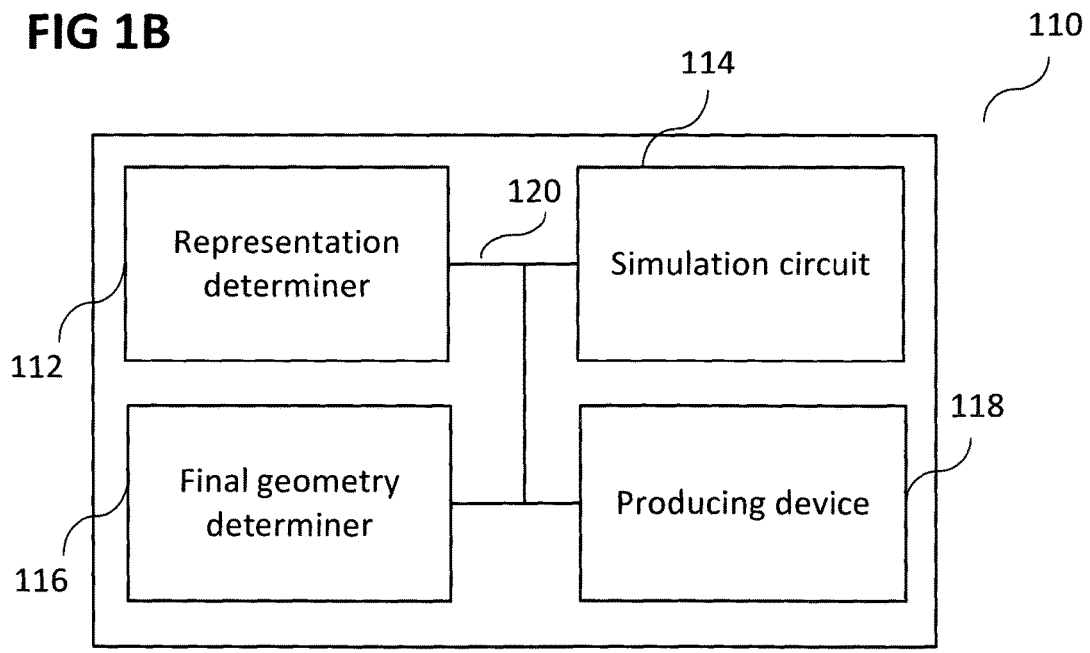

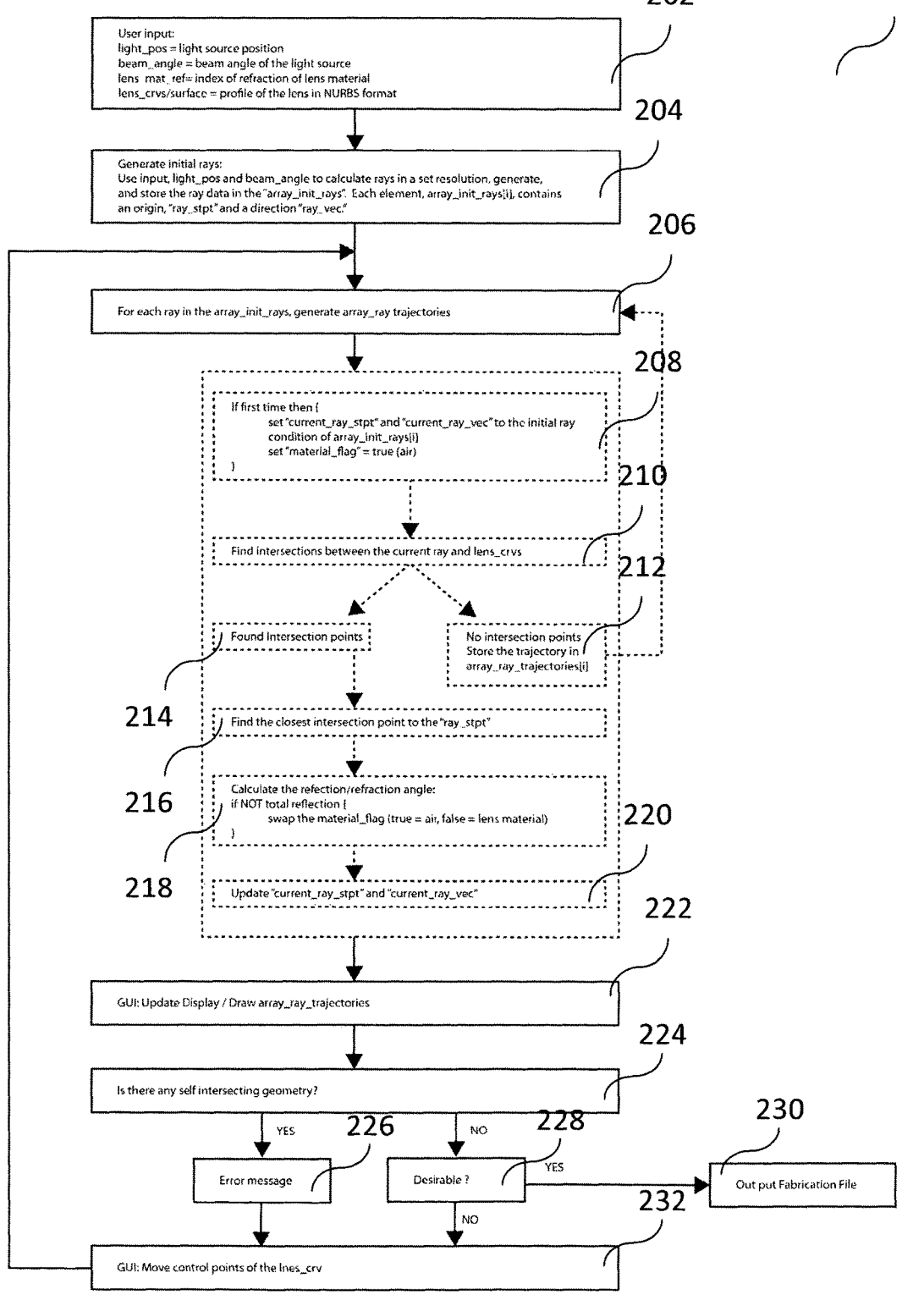

METHODS FOR MANUFACTURING A LENS, LENS MANUFACTURING SYSTEMS, AND LENSES

TECHNICAL FIELD

Embodiments relate generally to methods for manufacturing a lens, lens manufacturing systems, and lenses.

BACKGROUND

Lenses may be used for various applications. Thus, there may be a need for cost efficient and time efficient ways for producing lenses and for cost efficient lenses.

SUMMARY

According to various embodiments, a method for manufacturing a lens may be provided. The method may include: determining a NURBS (non-uniform rational basis spline) representation of a provisional lens geometry; simulating ray trajectories in a lens with the provisional lens geometry based on the NURBS representation; determining a final lens geometry based on the simulated ray trajectories; and producing a lens with the final lens geometry.

According to various embodiments, a lens manufacturing system may be provided. The lens manufacturing system may include: a representation determiner configured to determine a NURBS representation of a provisional lens geometry; a simulation circuit configured to simulate ray trajectories in a lens with the provisional lens geometry based on the NURBS representation; a final geometry determiner configured to determine a final lens geometry based on the simulated ray trajectories; and a producing device configured to produce a lens with the final lens geometry.

According to various embodiments, a lens produced according to the method may be provided.

According to various embodiments, a lens produced by the lens manufacturing system may be provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1A shows a flow diagram illustrating a method for manufacturing a lens according to various embodiments;

FIG. 1B shows a lens manufacturing system 110 according to various embodiments;

FIG. 2A, FIG. 2B and FIG. 2C shows a flow diagram illustrating the Ray Designer method according to various embodiments;

DESCRIPTION

Figure 2B:
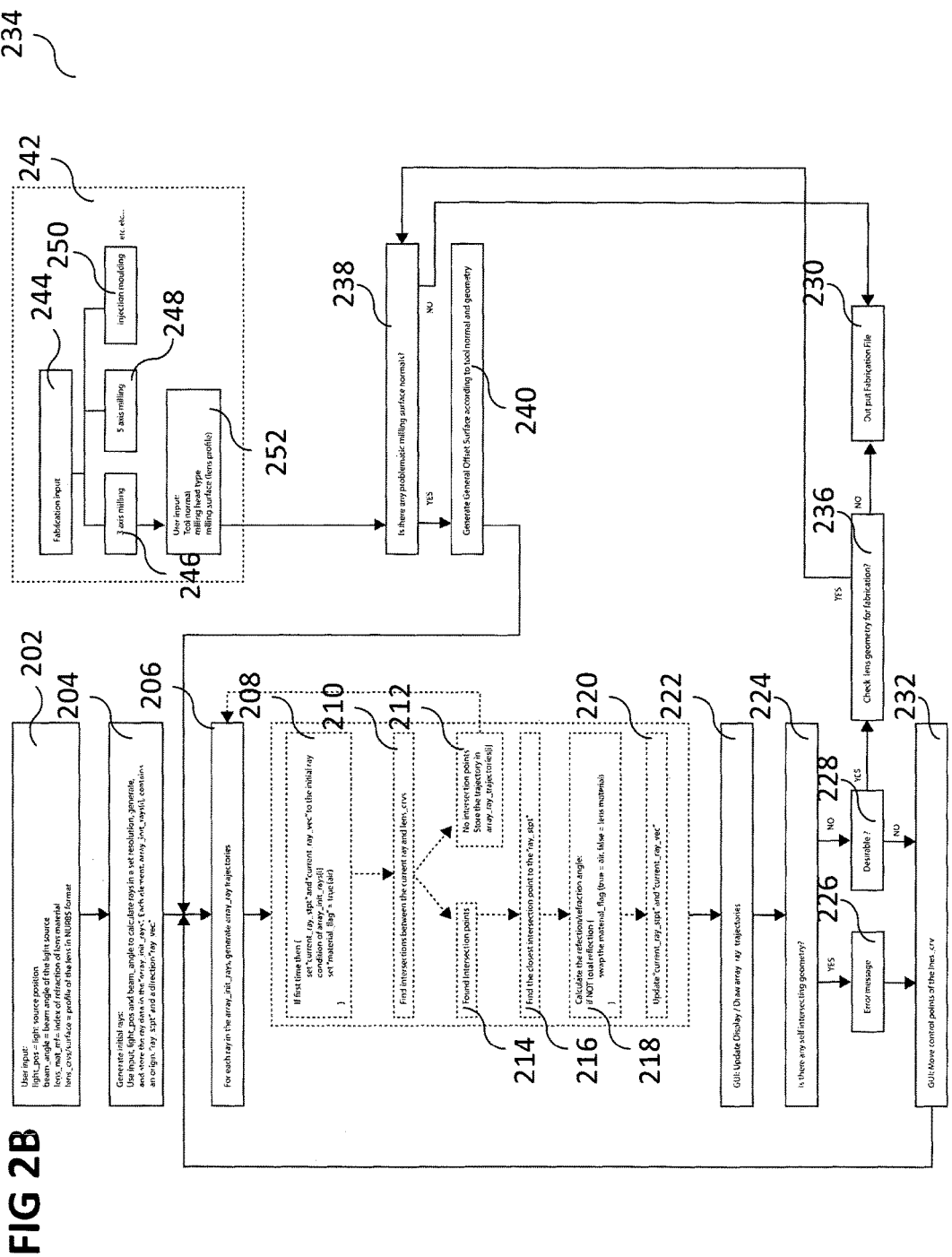

Embodiments described below in context of the devices are analogously valid for the respective methods, and vice versa. Furthermore, it will be understood that the embodiments described below may be combined, for example, a part of one embodiment may be combined with a part of another embodiment.

In this context, the lens manufacturing system as described in this description may include a memory which is for example used in the processing carried out in the lens manufacturing system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Lenses may be used for various applications. Thus, there may be a need for cost efficient and time efficient ways for producing lenses and for cost efficient lenses.

FIG. 1A shows a flow diagram 100 illustrating a method for manufacturing a lens according to various embodiments.

In 102, a NURBS representation of a provisional lens geometry may be determined. In 104, ray trajectories in a lens with the provisional lens geometry may be simulated based on the NURBS representation. In 106, a final lens geometry may be determined based on the simulated ray trajectories. In 108, a lens with the final lens geometry may be produced.

According to various embodiments, simulating the ray trajectories may include simulating reflection and refraction of a plurality of rays on an interface between a lens and air.

According to various embodiments, the interface may be defined by the provisional lens geometry.

According to various embodiments, the NURBS representation may represent the interface.

According to various embodiments, determining the final lens geometry may include repeatedly simulating ray trajectories in a series of lenses, each lens of the series of lenses having an iteratively adapted provisional lens geometry.

According to various embodiments, determining the final lens geometry may further include determining one of the series of iteratively adapted provisional lens geometries as a final lens geometry, based on an evaluation of the iteratively adapted provisional lens geometries.

According to various embodiments, the evaluation may include or may be an evaluation with respect to an objective function.

According to various embodiments, producing may include or may be at least one of milling or molding.

FIG. 1B shows a lens manufacturing system 110 according to various embodiments. The lens manufacturing system 110 may include a representation determiner 112 configured to determine a NURBS representation of a provisional lens geometry. The lens manufacturing system 110 may further include a simulation circuit 114 configured to simulate ray trajectories in a lens with the provisional lens geometry based on the NURBS representation. The lens manufacturing system 110 may further include a final geometry determiner 116 configured to determine a final lens geometry based on the simulated ray trajectories. The lens manufacturing system 110 may further include a producing device 118 configured to produce a lens with the final lens geometry. The representation determiner 112, the simulation circuit 114, the final geometry determiner 116 and the producing device 118 may be coupled with each other, for example via a connection 120, for example an optical connection or an electrical connection, such as for example a cable or a computer bus or via any other suitable electrical connection to exchange electrical signals.

According to various embodiments, the simulation circuit 114 may further be configured to simulate reflection and refraction of a plurality of rays on an interface between a lens and air.

According to various embodiments, the interface may be defined by the provisional lens geometry.

According to various embodiments, the NURBS representation may represent the interface.

According to various embodiments, the simulation circuit 114 may further be configured to repeatedly simulating ray trajectories in a series of lenses, each lens of the series of lenses having an iteratively adapted provisional lens geometry.

According to various embodiments, the final geometry determiner 116 may further be configured to determine one of the series of iteratively adapted provisional lens geometries as a final lens geometry, based on an evaluation of the iteratively adapted provisional lens geometries.

According to various embodiments, the evaluation may include or may be an evaluation with respect to an objective function.

According to various embodiments, the producing device 118 may be configured to produce the lens based on at least one of milling or molding.

According to various embodiments, a lens may be provided. The lens may be a lens that has been produced according to the method described herein.

According to various embodiments, the lens may include or may be made from acryl and/or polycarbonate.

According to various embodiments, a lens may be provided. The lens may be a lens that has been produced by the lens manufacturing system described herein.

According to various embodiments, the lens may include or may be made from acryl and/or polycarbonate.

FIG. 2A shows a flow diagram 200 illustrating a method, which may be called the Ray Designer method, according to various embodiments. The Ray Designer may be a ray tracing tool for lens geometry design. It may be used for simple lenses (like will be described in the following, for example for "Simp-lens") but also for lenses with more complex geometry which thus give more control to light trajectories. Commonly used methods do not allow simple and easy manipulation of the lens geometry itself beyond a few parameters of standard convex/concave shapes.

In 202, Ray Designer may take four inputs, (1) geometry of the lens in NURBS format, (2) index of refraction of the lens material, (3) position of the light source, and (4) beam angle of the light source, to compute ray trajectory.

In 204, initial rays may be generated. In 206, ray trajectories may be generated for each ray. In 208, an initial ray may be set to start in the air (in other words: outside the lens). In 210, an intersection between the ray and the lens may be determined. In case no intersections are found, processing may proceed in 212, where the trajectory may be stored, and subsequent processing may proceed in 206. In case intersection points are found (214), the closest intersection point to the ray starting point may be determined in 216. In 218, the reflection or refraction angle may be determined. In 220, the starting point and the direction of the ray may be updated. In 222, the ray may be visualized. In 224 it may be checked whether there is any self intersecting geometry. If so, an error message may be output in 226, and processing may proceed in 232. In case no self intersecting geometry is found, it may be determined whether the lens geometry (or lens design) is desirable in 228 (for example automatically by determining whether the rays fulfill a pre-determined objective function, or manually by taking user input). In case the lens geometry is desirable, processing may proceed to 230, where a fabrication file may be output; otherwise, processing may proceed in 232.

The Ray Designer method may allow one to move the control points of the lens profile curves (in 232) and interactively design light ray trajectories. (like will be shown in the following figures).

FIG. 2B shows a further flow diagram 234 illustrating a method according to various embodiments. Various steps of the method may be similar or identical to steps of the method shown in FIG. 2A, so that the same reference signs may be used and duplicate description may be omitted.

In 236, which may be executed in case it is determined in 228 that the lens geometry is desirable, it may be determined whether the lens geometry is to be checked for fabrication. If so, processing may proceed in 238, otherwise, processing may proceed by outputting the fabrication file in 230. In 238, it may be checked whether there are any problematic milling surface normals. Input to 238 may further be processing parameters determined in 242, like will be described in more detail below. If there are some problematic milling surface normals, processing may proceed in 240, where a general offset surface according to the tool normal and tool geometry may be generated, and processing may then proceed in 206. In case there are no problematic milling surface normal, processing may proceed by outputting the fabrication file in 230.

The production parameters may be set like indicated by dashed box 242. Fabrication input may be provided in 244, for example 3 axis milling may be set in 246, or 5 axis milling may be set in 248, or injection moulding may be set in 250. It will be understood that any other production technique may be chosen. As an example, further definition of the production technique is illustrated for 3 axis milling, where in 252 a tool normal, a milling head type, and a milling surface (which may correspond to the lens profile or lens geometry) may be input, for example by a user.

Figure 2C:
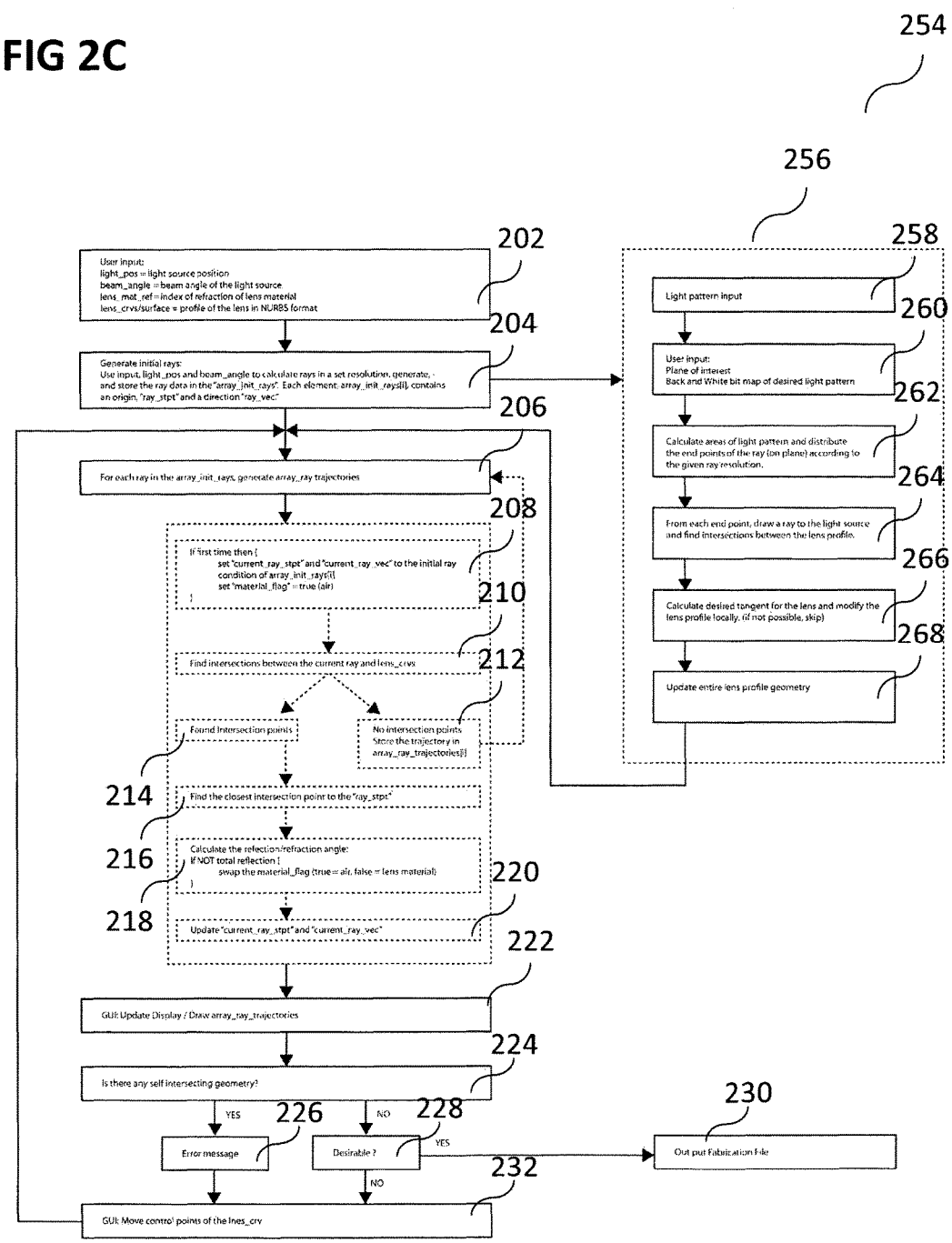

FIG. 2C shows a further flow diagram 254 illustrating a method according to various embodiments. Various steps of the method may be similar or identical to steps of the method shown in FIG. 2A, so that the same reference signs may be used and duplicate description may be omitted.

After generating initial rays in 204, an initial lens geometry may be determined in dashed block 256. For example, in 258, a (desired) light pattern may be input. In 206, a user may input a plane of interest, for example a black and white bit map of a desired light pattern. In 262, areas of light pattern may be determined, and the end points of the rays may be distributed on the plane according to a given ray resolution. In 264, a ray may be drawn from each end point to the light source, and intersections between the lens profile may be determined. In 266, the desired tangent for the lens may be calculated, and the lens profile may be modified locally (if this may not be possible, it may be skipped). In 268, the entire lens profile geometry may be updated.

Figure 2D:
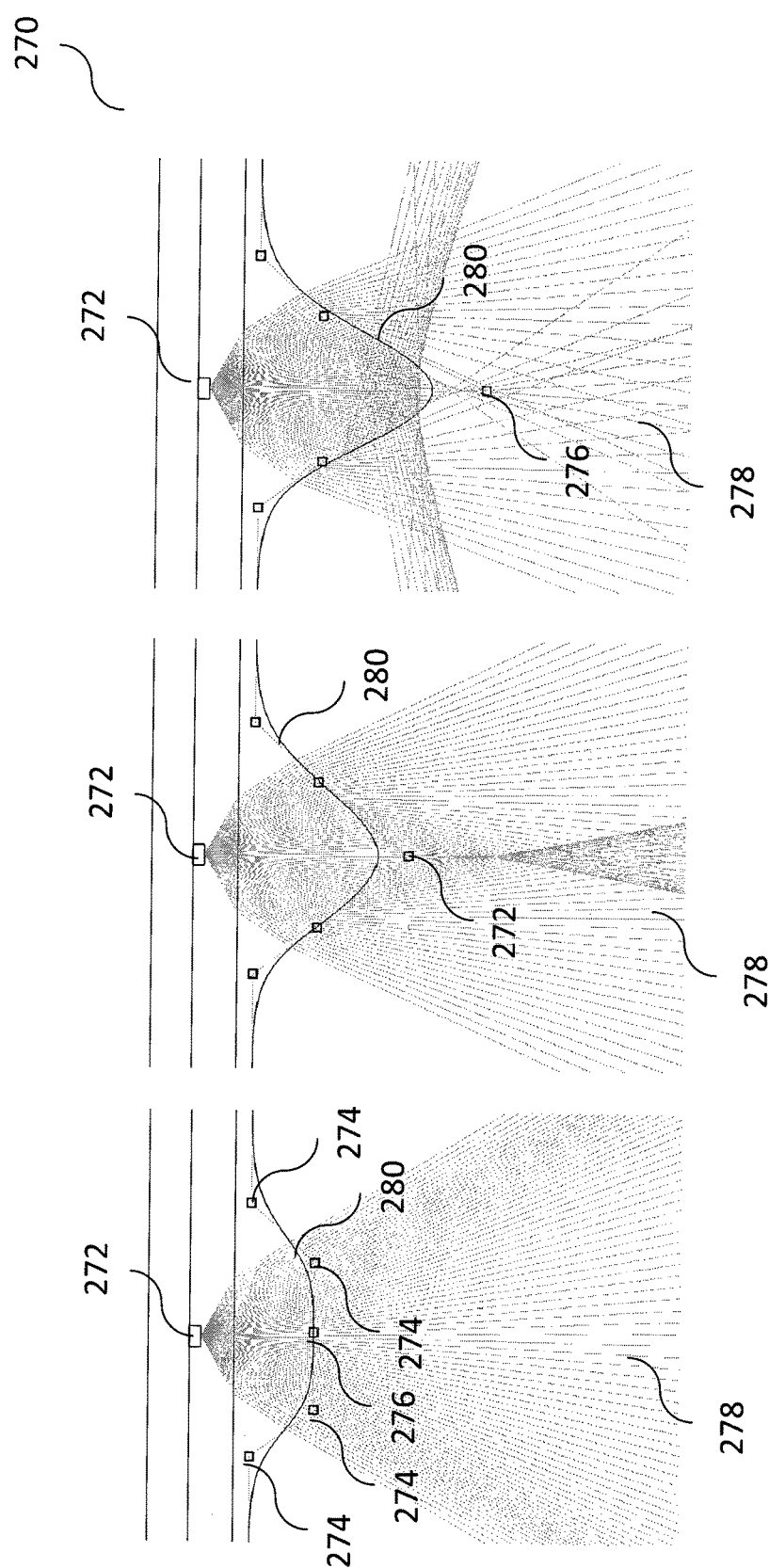
FIG. 2D shows an illustration of the Ray Designer according to various embodiments.

FIG. 2D shows an illustration 270 of the Ray Designer according to various embodiments. Three stages of the lens design may be shown in FIG. 2D. on the left side, a plurality of control points 274, 276 of the NURBS may define the lens geometry 280 and a light source 272 may send rays through the lens, so that a plurality of resulting rays 278 may be illustrated. In the middle illustration of FIG. 2D, the control point 276 of the NURBS has been moved further down, so that the resulting lens geometry 280 changes, and finally the resulting rays 278 also change. On the right hand side of FIG. 2D, the control point 276 is moved even further down, and again the resulting lens geometry 280 and the resulting rays 278 are shown.

Ray Designer may work for 2D cases, wherein NURBS curves may be input, and for 3D cases, where NURBS surfaces may be input.

Figure 3:
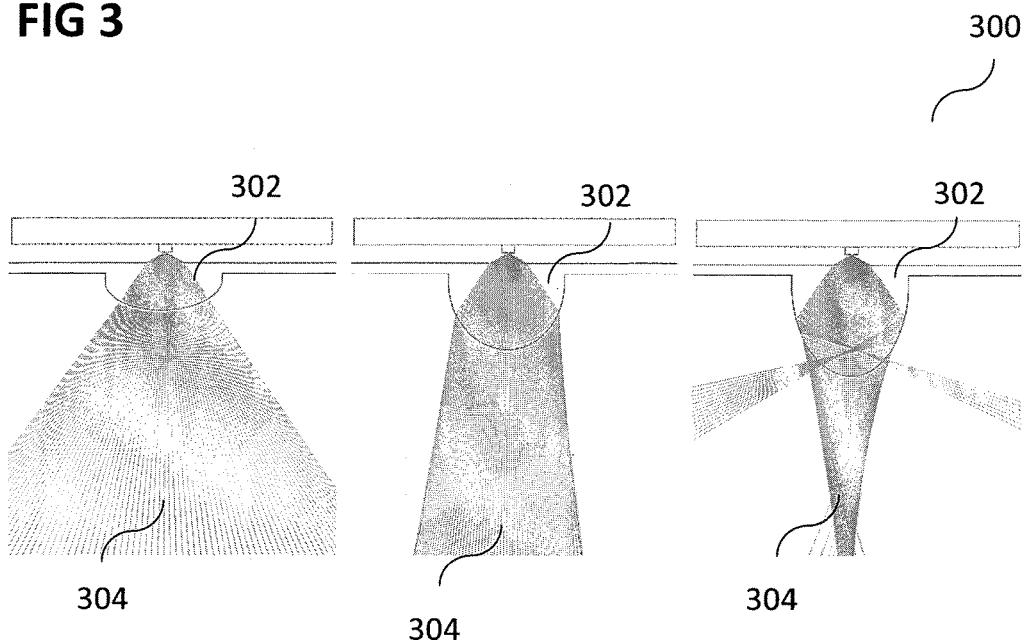
FIG. 3 shows an illustration of control of beam angle by shifting the height of the hemispheric geometry of the lens profile according to various embodiments.

FIG. 3A shows an illustration 300 of control of beam angle by shifting the height of the hemispheric geometry of the lens profile according to various embodiments. The lens geometry 302 and the resulting rays 304 are shown for a variety of lens geometries.

Figure 4:
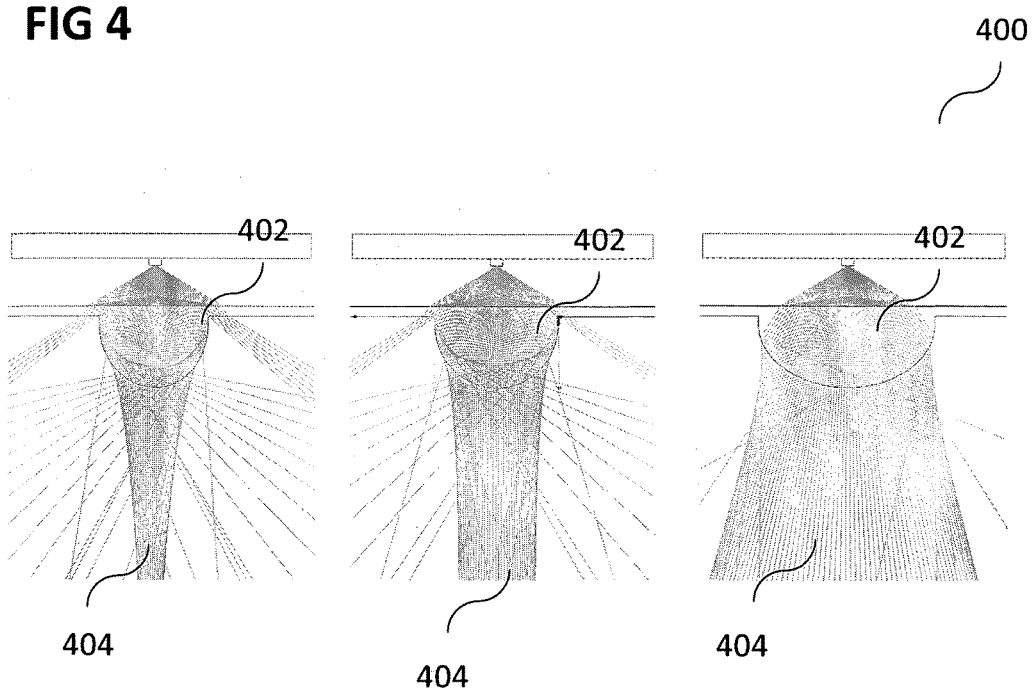
FIG. 4 shows an illustration of control of beam angle by shifting the base width of the hemispheric geometry of the lens profile according to various embodiments.

FIG. 4 shows an illustration 400 of control of beam angle by shifting the base width of the hemispheric geometry of the lens profile according to various embodiments. The lens geometry 402 and the resulting rays 404 are shown for a variety of lens geometries.

Figure 5A:
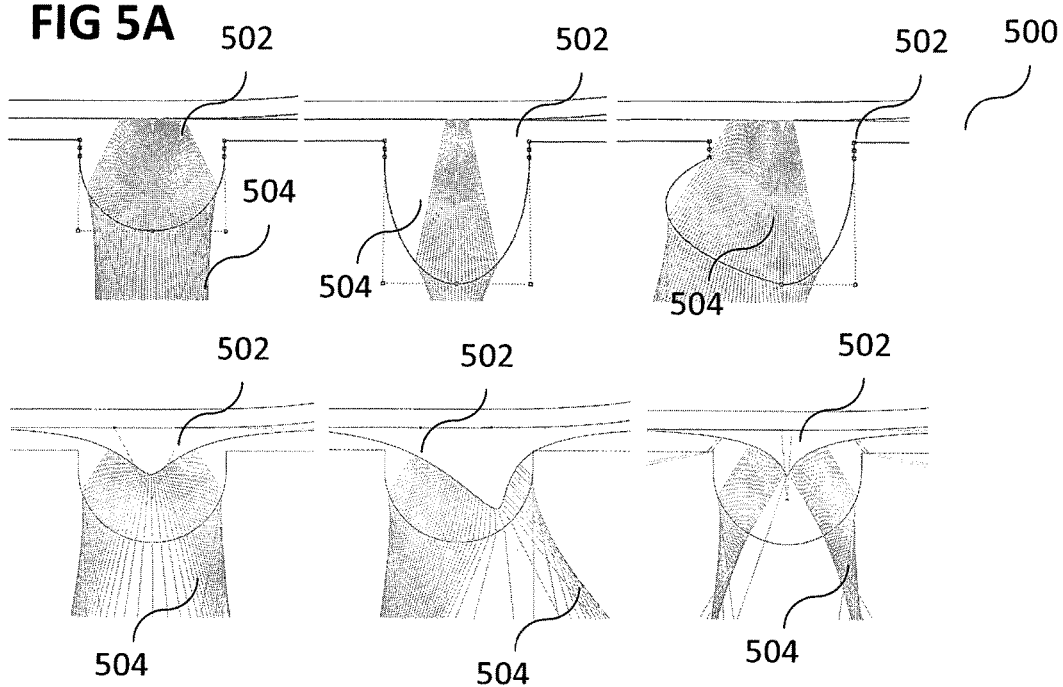
FIG. 5A and FIG. 5B show different ray trajectories interactively created by manipulating control points of the lens profile according to various embodiments.

FIG. 5A shows an illustration 500 of different ray trajectories interactively created by manipulating control points of the lens profile according to various embodiments. The lens geometry 502 and the resulting rays 504 are shown for a variety of lens geometries.

Figure 5B:
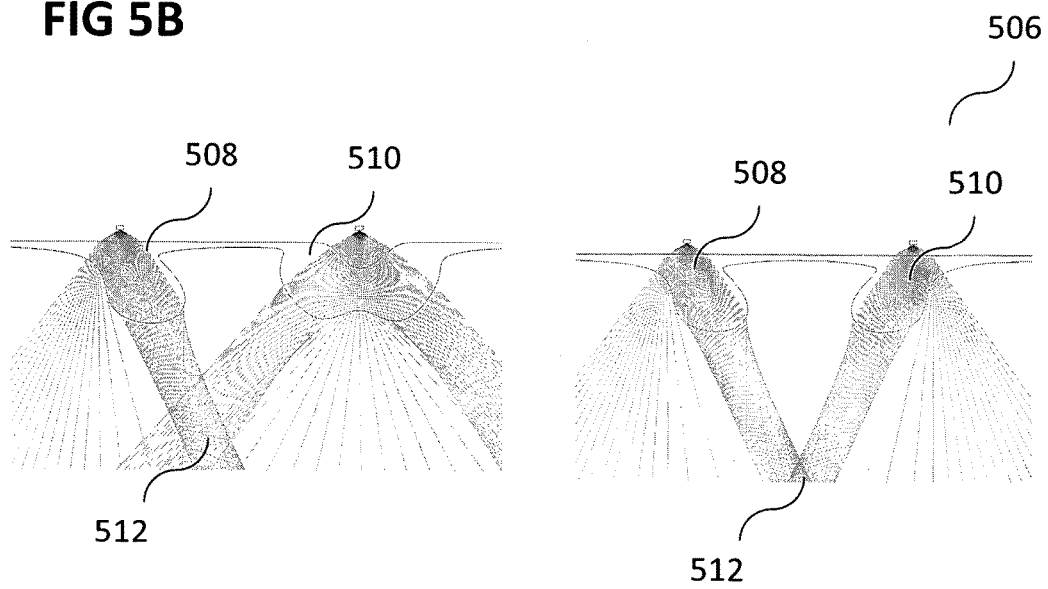

FIG. 5B shows an illustration 506 of different ray trajectories interactively created by manipulating control points of the lens profile according to various embodiments. The lens geometry may include a first lens 508 and a second lens 510, and for those two lenses, the resulting combined rays 512 are shown for a different lens geometries.

A lens that has been designed using the Ray Designer may be referred to as a Simp-lens. For example, the Simp-lens may relate to a low cost plastic LED lens or low cost plastic LED lenses. A typical LED unit may include an LED chip mounted on a circuit board which may give a near 180° beam angle. There may be many LED lenses with complex geometric features designed to control LED beam angle. However, due to the geometric complexity, for example undercuts and small features, the unit cost per lens may be quite expensive especially for low volume production or customized arrangements. Moreover, many applications such as interior and exterior decorative lighting do not require extreme accuracy in beam angle control as they are typically housed in the fixture design which, together with the lens, affects the light distribution. The Simp-lens for example may take basic hemispherical shape with no undercuts or small features. For example just by manipulating the base width and height of the hemisphere in relation to the LED chip position, the beam angle may be sufficiently controlled. Subsequent to the design using Ray Designer, a 3D model of the lens geometry may be produced and then the shape may for example be milled out using a CNC (computer numerical control) 3-axes milling machine from a block of acrylic material and such the lens may be produced. For example a 4 mm straight bit for a rough cut and a 4 mm end ball mill for the finish for prototypes may be used. It may allow for customized size as well as arrangement/distribution of the hemispheric lens at a very low price point. The performance has been tested using both acrylic and polycarbonate. Examples will be shown in the following figures.

Figure 6:
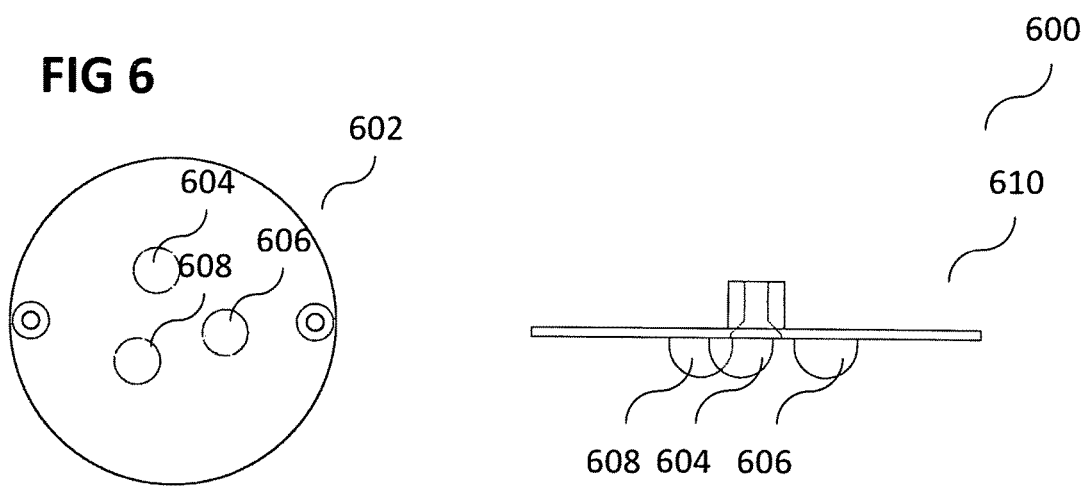
FIG. 6 shows a top view of the lens and a side view of the lens according to various embodiments.

FIG. 6 shows an illustration 600 of a top view 602 of a lens plate with three lenses 604, 606 and 608, and a side view 610 of the lenses 604, 606, and 608 according to various embodiments.

Figure 7A:
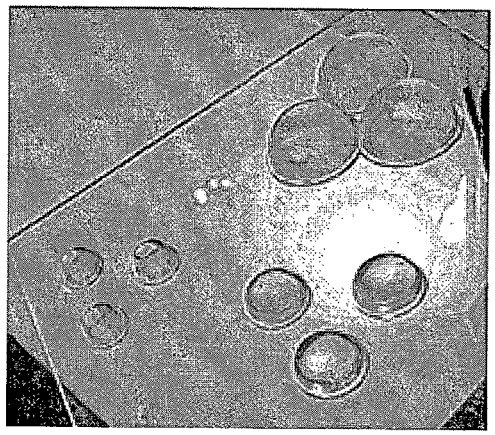
FIG. 7A and FIG. 7B show illustrations of physical testing using silicon stickers according to various embodiments.
Figure 7B:

FIG. 7A shows an illustration 700 and FIG. 7B shows an illustration 702 of a physical testing using silicon stickers according to various embodiments.

Figure 7C:
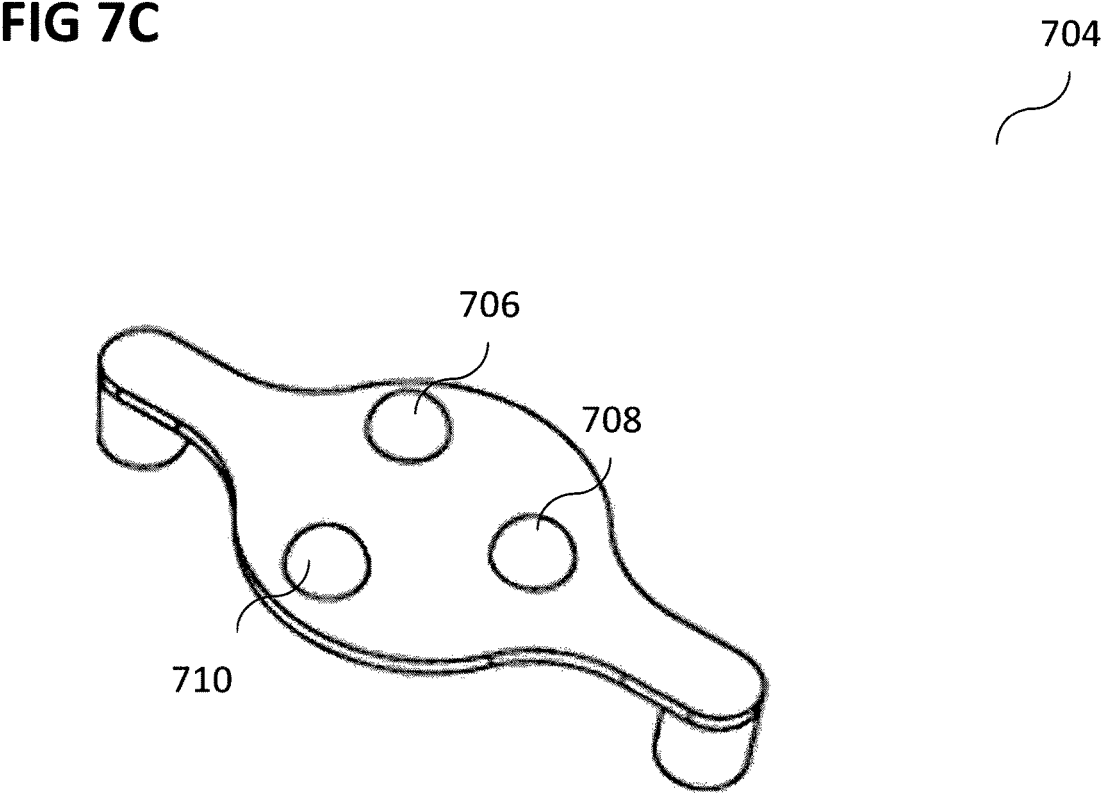
FIG. 7C shows an example of three lens system used for the physical testing with an 0.8 W LED at 2 m distance the lux level was 10 lux without the lens, 55 with the lens according to various embodiments.

FIG. 7C shows an example of a three lens system 704 with three lenses 706, 708, and 710 used for a further physical testing with an 0.8 W LED at 2 m distance. The lux level may be 10 lux without the lens, and 55 with the lens according to various embodiments.

An integrated lighting-hanging apparatus (or system) may be provided, which may be referred to as the Light Hanger (or the Light Hangers). It may be related to a space including such an apparatus and a method of providing an illumination profile and flexible hanging display system.

Figure 8A:
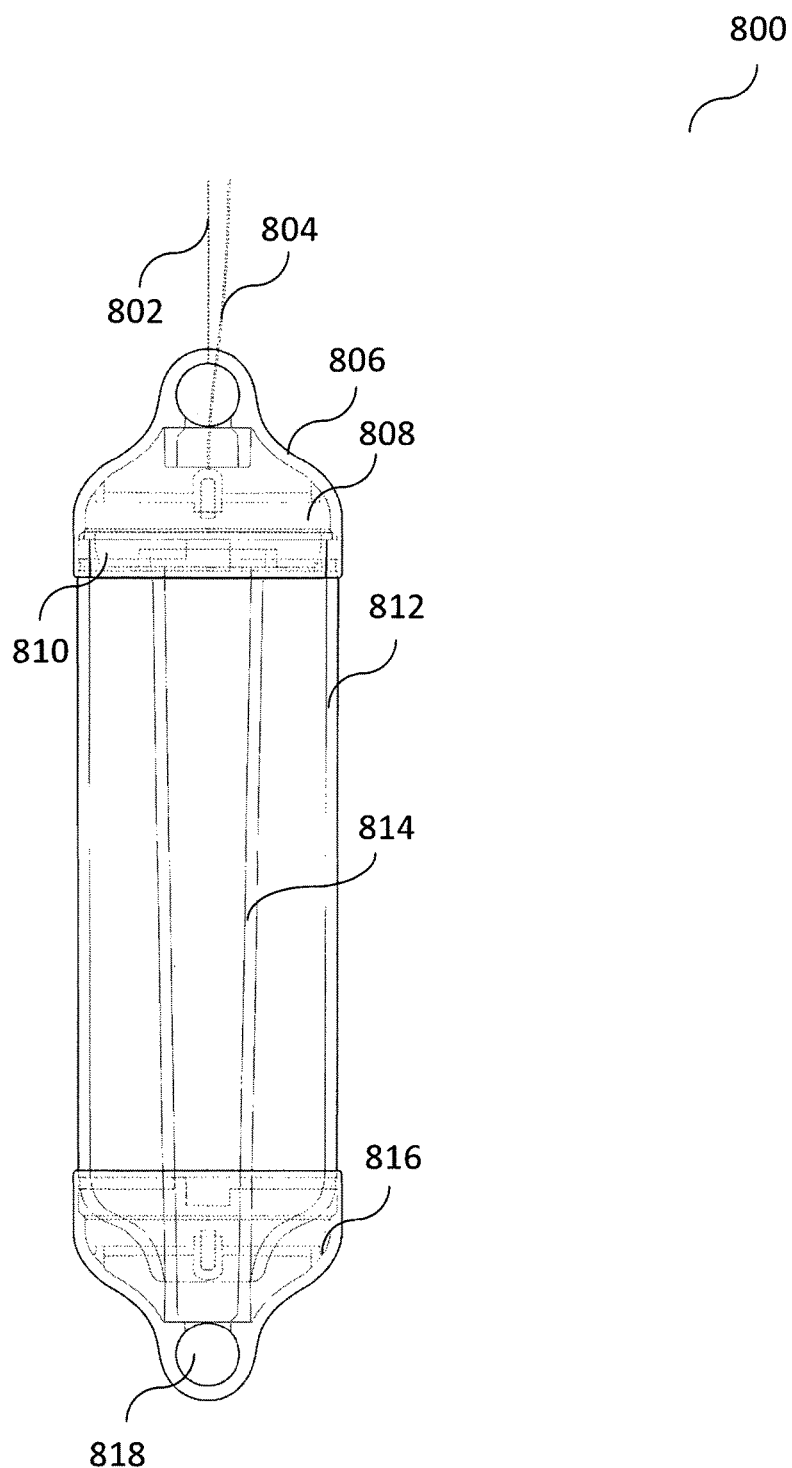
FIG. 8A shows a front view of a single light-hanger according to various embodiments.

FIG. 8A shows a front view 800 of a single light-hanger according to various embodiments. The light-hanger may include a top cap 806 (which may be identical to a bottom cap 816), an light source 808 (for example an LED), a lens 810 (for example Simp-lens), an outer body 812, an inner body 814, the bottom cap 816 (which may be identical to the upper cap 806), a hanging point 818 (for example for loads of up to approximately 10 kg), a hanging cable 802, and an electric wire 804.

A Light Hanger may be composed of two tubular bodies (for example the outer body 812 and the inner body 814) and pairs of attachment caps (for example the top cap 806 and bottom cap 816, that are identical), and a lens 810 which may be the Simp-lens as described above. The outer body 812 may provide general shape to the assembly and may act as a diffuser to avoid direct light to reach one's eyes. The inner body 814 may act as a light traveling medium, utilizing refractive characteristics of the material. The cap (for example top cap 806) may have loop geometry where one can hang the apparatus itself from the ceiling with the top cap, while the bottom cap 816 may allow one to hang objects at the bottom of the apparatus.

Figure 8B:
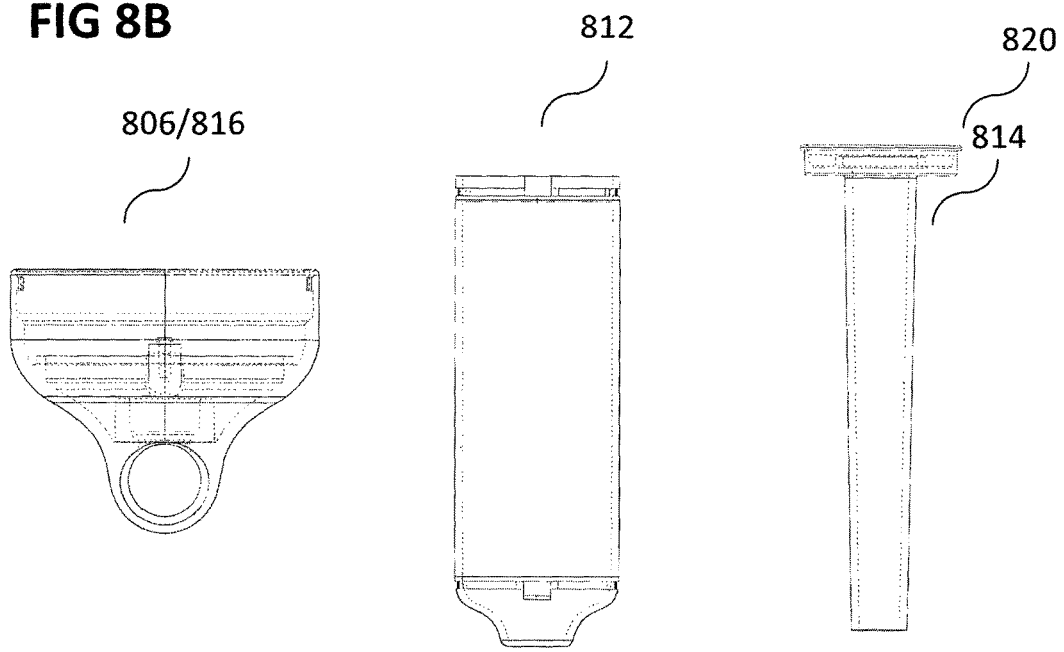
FIG. 8B shows a front view of a cap, an outer body and an inner body according to various embodiments.

FIG. 8B shows a front view 820 of the cap 806 or 816 the outer body 812, and the inner body 814 according to various embodiments.

Figure 8C:
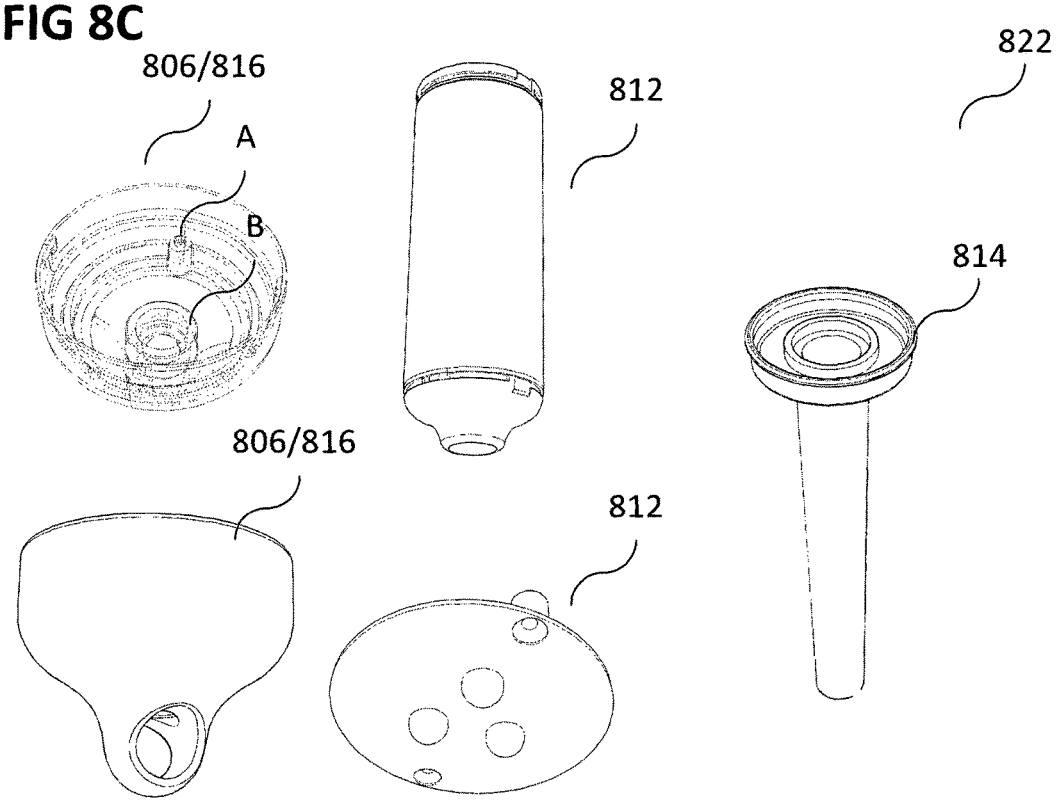
FIG. 8C shows a perspective view of a cap, a lens, an outer body, and an inner body according to various embodiments.

FIG. 8C shows a perspective view 822 of the cap 806 or 816, the lens 810, the outer body 812, and the inner body 814 according to various embodiments.

The two small tubular stands (A in FIG. 8C) of the cap 806 may be used to attach the light source and the lens. The inner circular stand (B in FIG. 8C) of the cap 806, 816 may be designed to connect to the end of the inner body 814 to travel the light to the end of the cap 816. As a result, though the light source is only at the top of the apparatus, the bottom end appears to be shining. One can easily attach or remove the caps 806, 816 from the bodies thus the assembly of the elements allows the Light Hanger(s) to have three different states:

[state 1] top cap 806+lens 810+bodies (outer body 812, and optionally inner body 814)+end cap 816;

[state 2] top cap 806+lens 810+bodies (outer body 812, and optionally inner body 814); or

[state 3] top cap 806+lens 810.

When at state 1, one can have objects hanging from the apparatus with diffused light. When at state 2, one can have focused light. When at state 3, one can have direct lighting; however, this state may be intended for easy replacement of the light source, for example the LED. The entire assembly may for example hang objects up to approximately 10 kg.

Figure 8D:
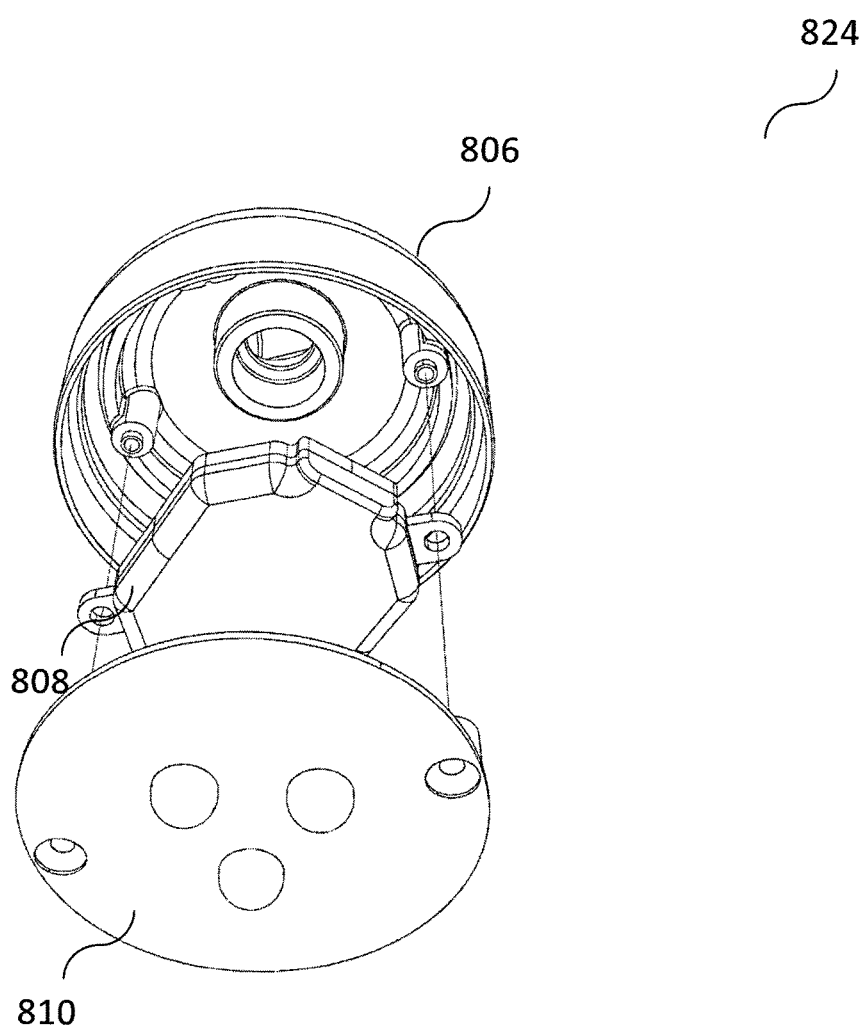
FIG. 8D shows an exploded view of a cap and LED (light emitting diode) and a lens according to various embodiments.

FIG. 8D shows an exploded view 824 of the cap 806, the LED 808, and the lens 810 according to various embodiments.

Figure 8E:
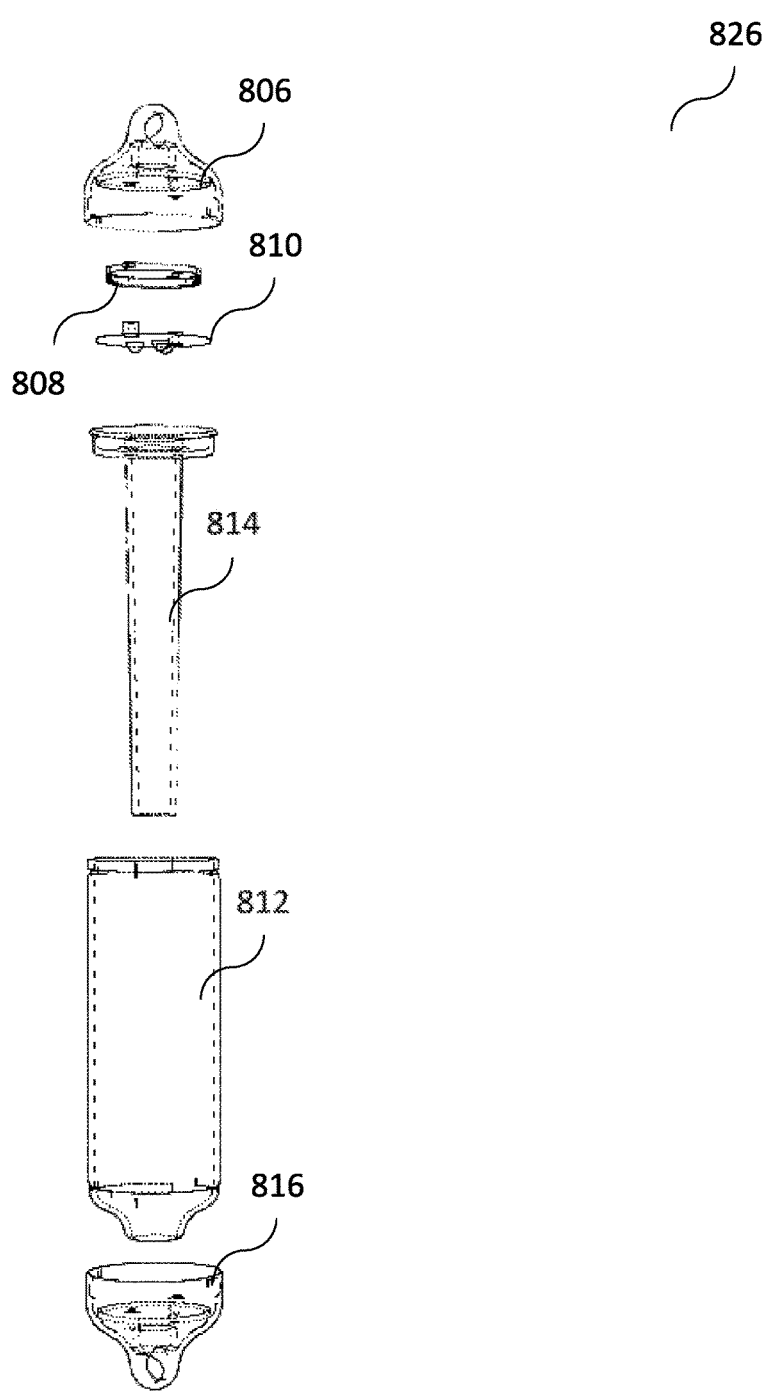
FIG. 8E shows an exploded view of an entire structure according to various embodiments.

FIG. 8E shows an exploded view 826 of the entire structure according to various embodiments.

The Light Hanger may be designed as both lighting and hanging system to be used either by itself or in multiple. In the case of multiple installations, one might use a single point to hang a plant pot, use two points to hang a fabric to make a screen, three or more to create a cabinet or shelving unit, or use multiple points altogether to create a complex three dimensional field and perform tests with flying robots, for instance. The Light Hangers may act as a system of dense spatial connections inducing new ways of occupancy and types of connectivity.

Figure 9:
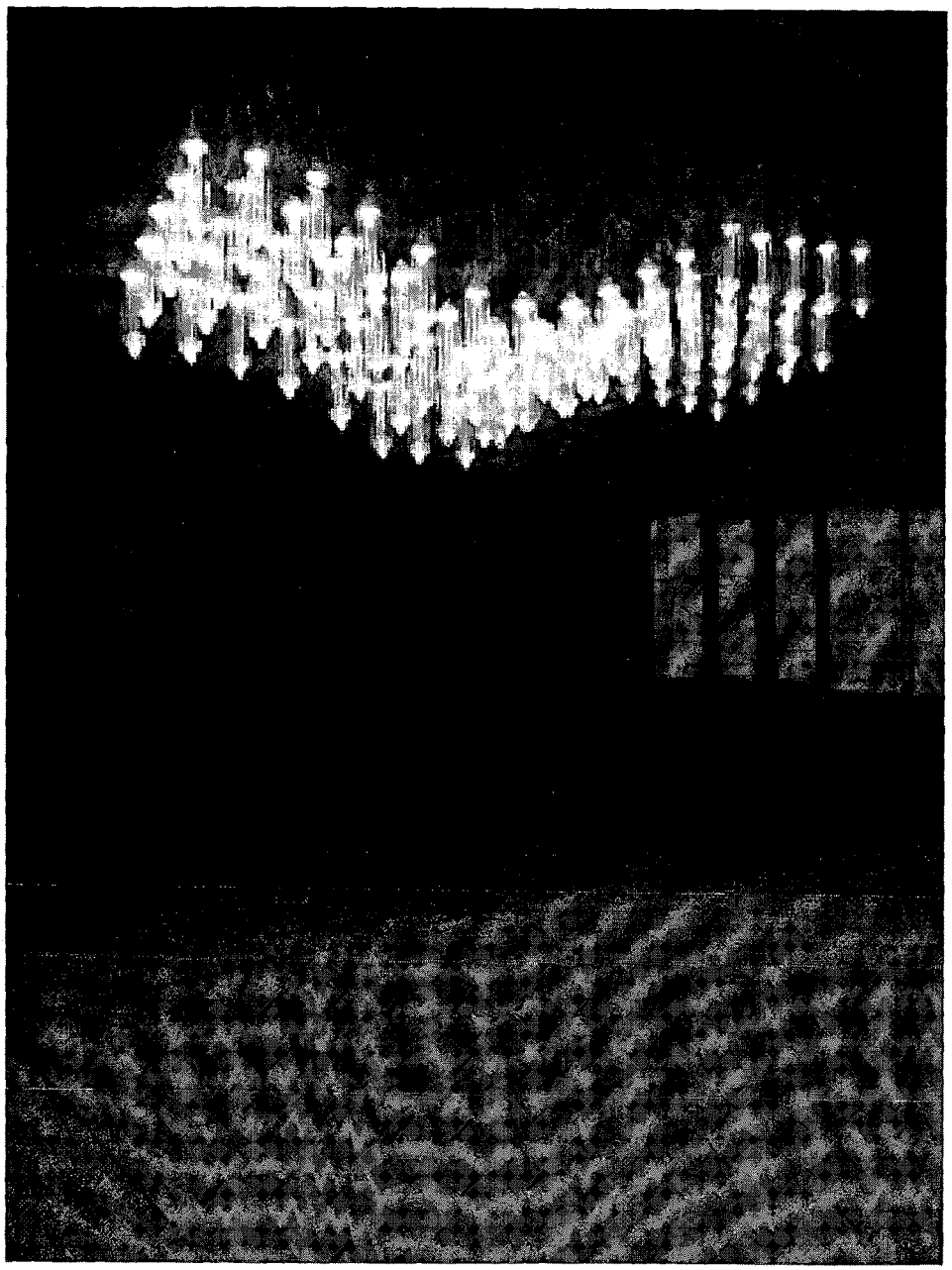
FIG. 9 shows a mock-up of the light hanger(s) system according to various embodiments.

FIG. 9 shows a mock-up 900 of the Light Hanger(s) system according to various embodiments.

Figure 10:
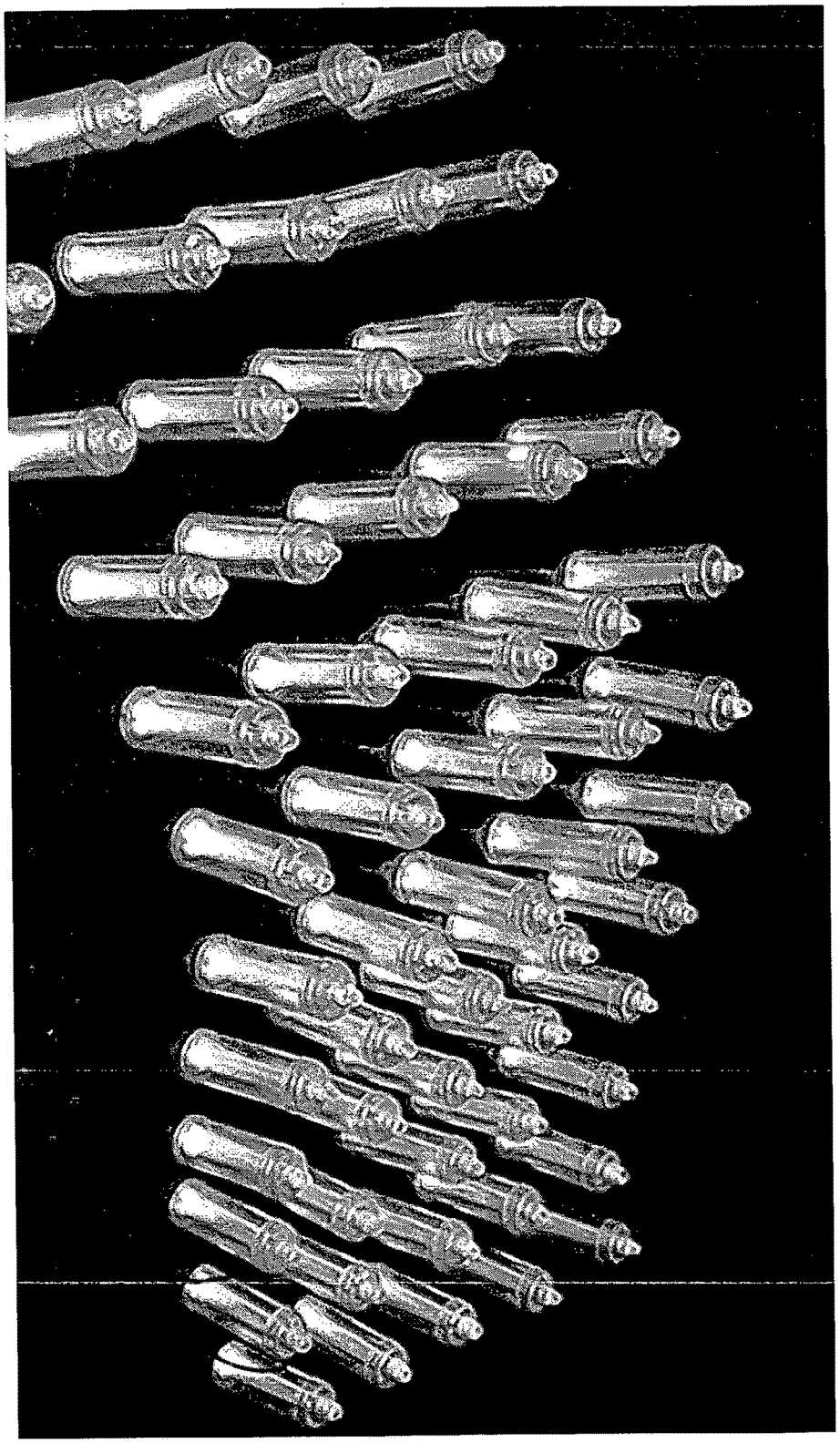
FIG. 10 shows a mock-up of the light hanger(s) system according to various embodiments.

FIG. 10 shows a mock-up 1000 of the Light Hanger(s) system according to various embodiments.

Figure 11:
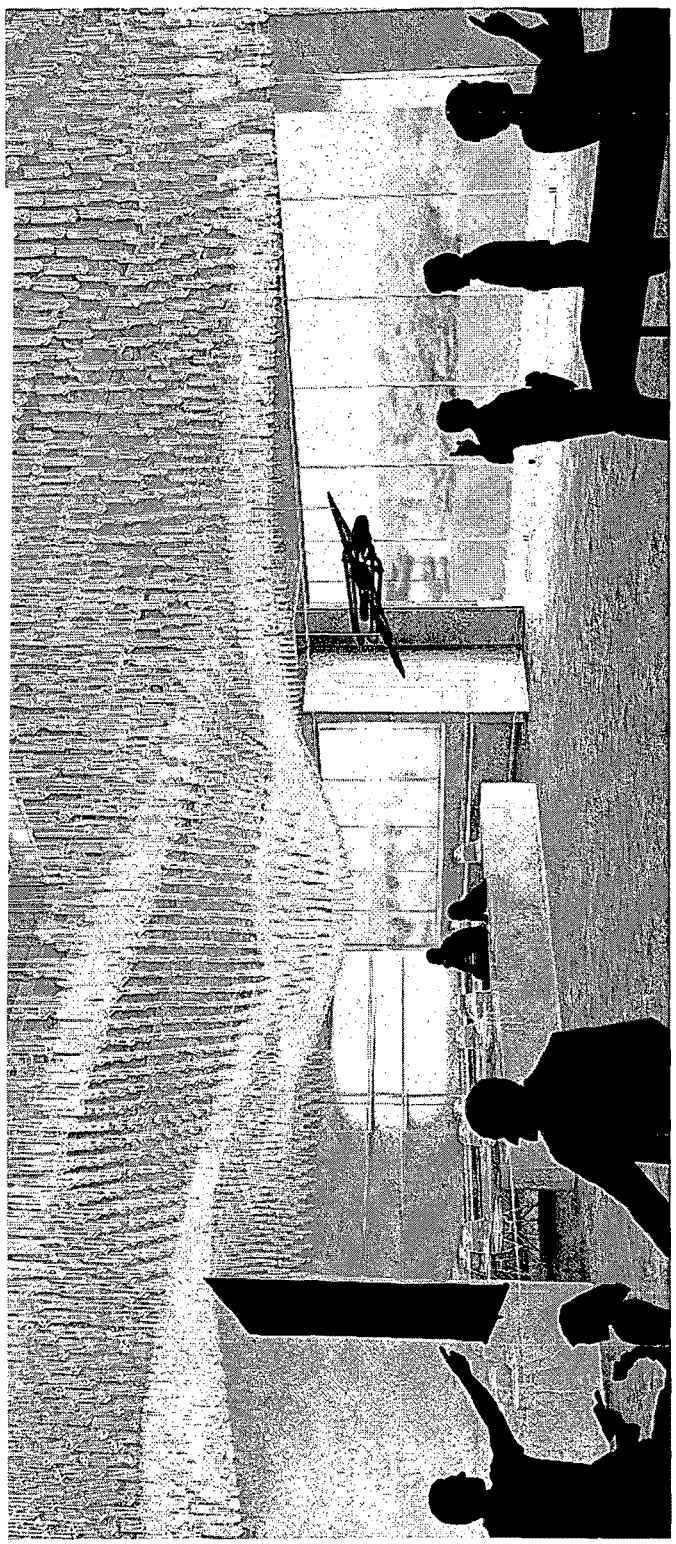
FIG. 11 shows a rendering of a proposed gallery space with light-hangers according to various embodiments.

FIG. 11 shows a rendering 1100 of a proposed gallery space with light-hangers according to various embodiments.

According to various embodiments, an illuminating device (for example the light hanger) for illuminating a display may be provided. The illuminating device may include: a light source (for example an LED) configured to emit light; a light guiding member (for example inner body) having a proximal end and a distal end opposite the proximal end, wherein the light source is disposed at about the proximal end of the light guiding member, wherein the light guiding member is designed to allow light emitted from the light source to enter the light guiding member at the proximal end and exit the light guiding member at the distal end; and a distal anchoring member (for example a lower cap) for the display to anchor on, the distal anchoring member designed to be connected to the light guiding member at about the distal end, wherein light exiting from the light guiding member is configured to illuminate the display.

According to various embodiments, the illuminating device may further include a distal end cap (for example top cap) having a connecting portion and an anchoring portion opposite the connecting portion, the connecting portion designed to connect the distal end cap to the light guiding member at about the distal end and the anchoring portion includes the distal anchoring member.

According to various embodiments, the illuminating device may further include a proximal anchoring member connected to the light guiding member at about the proximal end.

According to various embodiments, the illuminating device may further include a proximal end cap having a connecting portion and an anchoring portion opposite the connecting portion, the connecting portion designed to connect the proximal end cap to the light guiding member at about the proximal end, the anchoring portion includes the proximal anchoring member, and wherein the light source is disposed within the proximal end cap.

According to various embodiments, the illuminating device may further include a reinforcing structure (for example outer body) extending from the proximal end cap to the distal end cap.

According to various embodiments, the reinforcing structure may include or may be a cylindrical sleeve surrounding the light guiding member, wherein the reinforcing structure may include a proximal engaging end and a distal engaging end, wherein the proximal engaging end is designed to engage the proximal end cap and the distal engaging end is designed to engage the distal end cap.

According to various embodiments, the light guiding member may be elongated and may extend from about the light source to about the distal anchoring member.

According to various embodiments, the light guiding member may include or may be a tube.

According to various embodiments, the illuminating device may further include a refractive element (for example a lens, for example Simp-lens) disposed between the light source and the light guiding member, wherein light emitted from the light source passes through the refractive element before entering the light guiding member at the proximal end.

According to various embodiments, the refractive element may include or may be at least one lens.

According to various embodiments, the light guiding element may include an aligning member at about the proximal end of the light guiding element, the aligning member designed to be coupled to the reinforcing structure for aligning the light guiding element along the longitudinal axis of the cylindrical sleeve.

According to various embodiments, the light source may include a plurality of light emitting devices (for example for providing a more focused light).

According to various embodiments, the light source may include or may be LED lights.

According to various embodiments, the distal anchoring member may include or may be an eye for hanging the display.

According to various embodiments, the proximal anchoring member may include or may be an eye.

According to various embodiments, the light guiding member may be tapered such that the width at about the proximal end is wider than the width at the distal end of the light guiding member.

As part of the Light Hanger (assembly) may be an LED lens, for example Simp-lens, as described above, and a lens design method encapsulated in a tool, for example Ray Designer as described above, that has wider application. The lens(es) may be used for one or multiple LED chips, or may be attached to existing LED units. The lens may be suitable for a volume custom production at a low price point. The Ray Designer may be a simple and easy to use optical lens design method and software. It may allow interactive or automated development of lens shape by manipulating the control points of the lens profile curve.

Light Hangers may be industrially applicable for markets in countries looking for unique lighting and hanging display solutions. Simp-lens and Ray Designer may be industrially applicable by LED manufacturers and lighting design industry.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An illuminating device comprising
a light source configured to emit light;
a light guiding member having a proximal end and a distal end opposite the proximal end, wherein the light source is disposed at about the proximal end of the light guiding member, wherein the light guiding member is designed to allow light emitted from the light source to enter the light guiding member at the proximal end and exit the light guiding member at the distal end; and
a proximal anchoring member connected to the light guiding member at about the proximal end;
wherein the proximal anchoring member includes an eye.

2. The illuminating device of claim 1, further comprising:
a distal anchoring member for a display to anchor on, the distal anchoring member designed to be connected to the light guiding member at about the distal end, wherein light exiting from the light guiding member is configured to illuminate the display.

3. The illuminating device of claim 2, further comprising a distal end cap having a connecting portion and an anchoring portion opposite the connecting portion, the connecting portion designed to connect the distal end cap to the light guiding member at about the distal end and the anchoring portion comprises the distal anchoring member.

4. The illuminating device of claim 3, wherein the distal end cap is configured to diffuse light.

5. The illuminating device of claim 1, further comprising a proximal end cap having a connecting portion and an anchoring portion opposite the connecting portion, the connecting portion designed to connect the proximal end cap to the light guiding member at about the proximal end, the anchoring portion comprises the proximal anchoring member, and wherein the light source is disposed within the proximal end cap.

6. The illuminating device of claim 3, further comprising a reinforcing structure extending from a proximal end cap to the distal end cap.

7. The illuminating device of claim 6, wherein the reinforcing structure includes a cylindrical sleeve surrounding the light guiding member, wherein the reinforcing structure comprises a proximal engaging end and a distal engaging end, wherein the proximal engaging end is designed to engage the proximal end cap and the distal engaging end is designed to engage the distal end cap.

8. The illuminating device of claim 2, wherein the light guiding member is elongated and extends from about the light source to about the distal anchoring member.

9. The illuminating device of claim 1, wherein the light guiding member includes a tube.

10. The illuminating device of claim 1, further comprising a refractive element disposed between the light source and the light guiding member, wherein light emitted from the light source passes through the refractive element before entering the light guiding member at the proximal end.

11. The illuminating device of claim 10, wherein the refractive element comprises at least one lens.

12. The illuminating device of claim 6, wherein the light guiding element comprises an aligning member at about the proximal end of the light guiding element, the aligning member designed to be coupled to the reinforcing structure for aligning the light guiding element along the longitudinal axis of the cylindrical sleeve.

13. The illuminating device of claim 2, wherein the distal anchoring member includes an eye for hanging the display.

14. The illuminating device of claim 1, wherein the light guiding member is tapered such that the width at about the proximal end is wider than the width at the distal end of the light guiding member.

15. The illuminating device of claim 1, further comprising at least one lens.

16. A method for manufacturing an illuminating device, the method comprising
providing a light source configured to emit light;
providing a light guiding member having a proximal end and a distal end opposite the proximal end, wherein the light source is disposed at about the proximal end of the light guiding member, wherein the light guiding member is designed to allow light emitted from the light source to enter the light guiding member at the proximal end and exit the light guiding member at the distal end; and
a proximal anchoring member connected to the light guiding member at about the proximal end;
wherein the proximal anchoring member includes an eye.

* * * * *